UNITED STATES PATENT OFFICE.

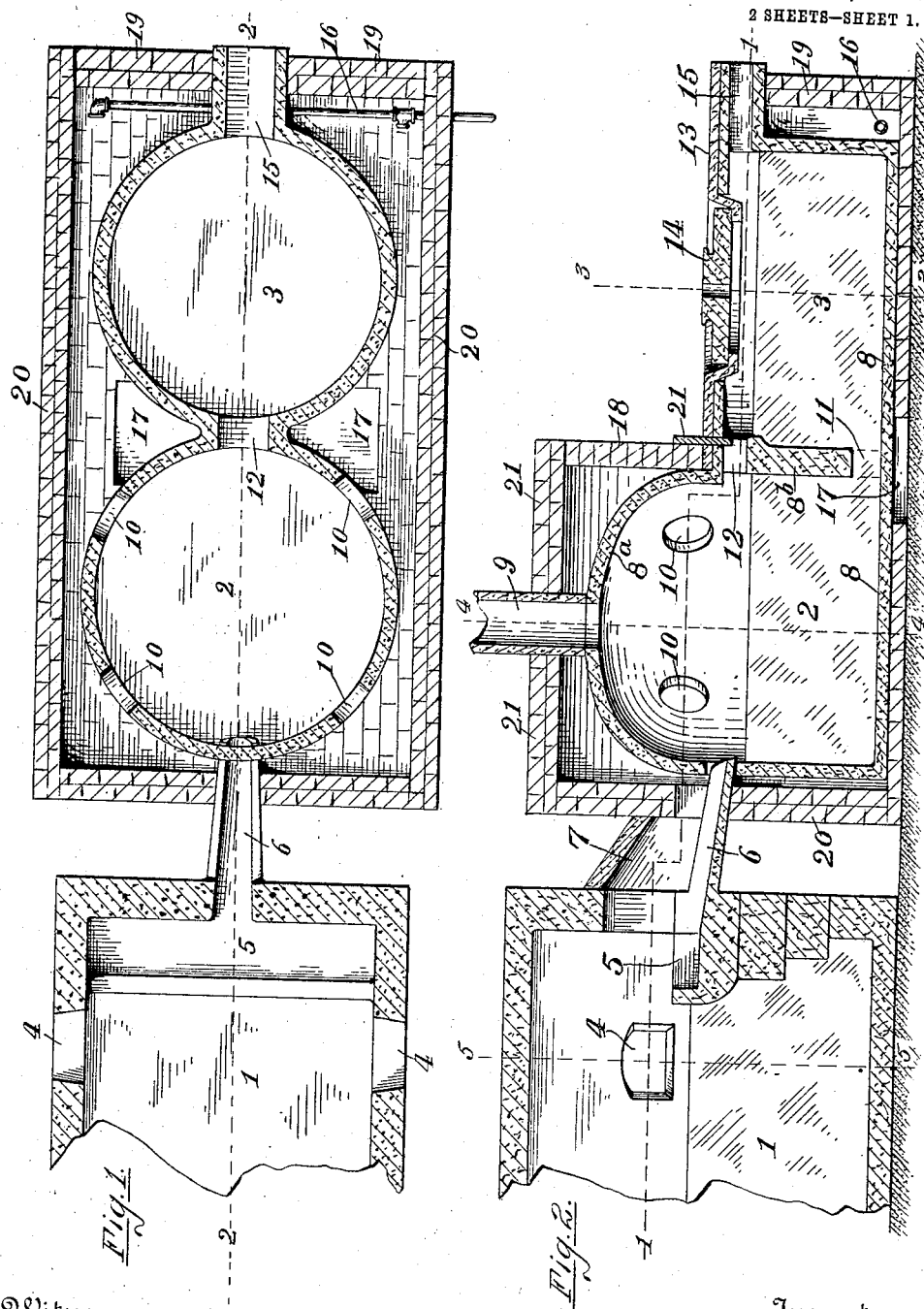

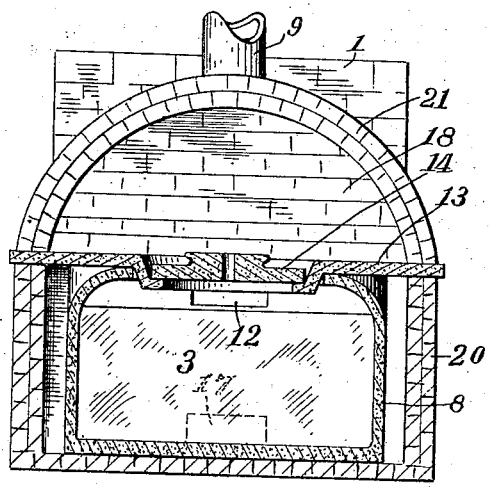
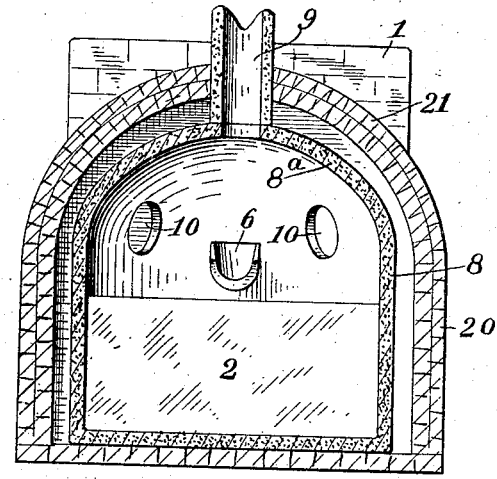
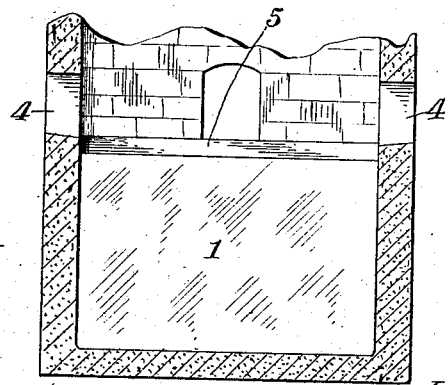

ULGISSE HOUZE, OF GRAND RAPIDS, MICHIGAN.

GLASS HEATING AND DRAWING FURNACE.

935,789.  Specification of Letters Patent. Patented Oct. 5, 1909.

Application filed February 4, 1909. Serial No. 475,993.

*To all whom it may concern:*

Be it known that I, ULGISSE HOUZE, a citizen of the United States of America, residing at Grand Rapids, in the county of Kent and State of Michigan, have invented certain new and useful Improvements in Glass Heating and Drawing Furnaces; and I do hereby declare the following to be a full, clear, and exact description of the invention, such as will enable others skilled in the art to which it appertains to make and use the same.

My invention relates to improvements in glass heating and drawing furnaces, and its object is to provide the same with means whereby melted glass may be carried at different levels in the melting tank and in the pot respectively; to provide improved means for heating glass in the pot; to provide improved means for skimming the glass in the drawing pot, and in various novel features of combination and arrangement of parts, hereinafter more fully described and particularly pointed out in the claims, reference being had to the accompanying drawings, in which:

Figure 1 is a horizontal section of a device embodying my invention taken on the line 1—1 of Fig. 2; Fig. 2 a vertical section of the same taken on the line 2—2 of Fig. 1; Fig. 3 a transverse vertical section on the line 3—3 of Fig. 2; Fig. 4 the same on the line 4—4 of Fig. 2; and, Fig. 5 the same on the line 5—5 of Fig. 2.

Like numbers refer to like parts in all of the figures.

1 represents a melting tank having the usual means of heating the same, not shown.

2 is the reheating pot, and 3 the drawing 
pot from which latter the glass is drawn in cylindrical form for making window glass, or for other like purposes.

In the side of the tank 1 and suitably located above the level of the glass therein, are side openings 4 through which may be inserted a ladle, not shown, the handle of which can be fulcrumed on the bottom wall of the opening for the purpose of transferring the melted glass from the tank to a trough 5, which trough is located within the tank and projecting inward from one wall thereof, through which wall is an opening communicating with the trough through which opening extends a spout 6, downwardly inclined and extending through the inclosing wall 20 and the side of the reheating pot 2 to discharge the glass into the said pot whereby the glass may be manually transferred from the tank to the pot in any desired amount as occasion requires. This spout 6 is preferably provided with a cover 7 to protect the glass flowing through the spout, and the reheating pot 2 is provided with a dome top 8ª having a number of openings 10 therein above the level of the glass, and a chimney 9 is provided communicating with an opening at the top of the dome 8ª. This reheating pot is inclosed by brick walls 20 spaced apart therefrom, and communicates at the bottom of one side through an opening 11 in a separating wall 8ᵇ with the drawing pot 3. The top of this drawing pot is provided with a removable cover 13 in which is a central opening provided with a removable closure 14 through which opening the glass cylinder is drawn in the usual way.

Beneath the bottom 8 of the pots 2 and 3 is a passage 17 permitting the flames from any suitable burners attached to the pipes 16, to play all around the connecting passage 11 between the pots to keep the glass hot therein.

15 is an opening at the front of the pot 3 through which a suitable tool, not shown, may be inserted to skim the surface of the glass in said pot, and 12 is an opening opposite the opening 15 between the pots 2 and 3 whereby the materials skimmed off the glass may be carried back into the pot 2 to be reheated.

16 is any suitable pipe to supply fuel to burners, not shown, attached thereto, whereby heat is applied to the pots 2 and 3, which heat passes back between the pots and the inclosing walls 20, and thence through the openings 10, and plays upon the surface of the glass in the pot 2, and also through the opening 12 upon the surface of the glass in the pot 3 to keep the same properly heated.

21 is a gate to partially or wholly close the passage 12 to cut off the heat from the pot 3, and prevent over heating the glass cylinder as it rises through the opening in the cover of the pot.

To readily remove the pots 2 and 3, the portions 18 and 19 of the inclosing walls are laid without mortar or cement and are easily removed and replaced, and when so removed, afford openings through which the pots may be removed and replaced at pleasure, without disturbing the remainder of the inclosing masonry.

What I claim is:—

1. A glass heating and drawing furnace, comprising a melting tank having side openings to permit insertion of a manually operated ladle, a heating pot near the tank, a trough in the tank at the end adjacent to the pot and a spout communicating with the trough and pot whereby the melted glass may be transferred from the tank to the pot at pleasure.

2. A glass heating and drawing furnace, comprising a melting tank a heating pot and a drawing pot arranged in a series, a trough and a spout to convey melted glass from the tank to the heating pot, a partition between the heating pot and the drawing pot and having a bottom opening, a dome to the heating pot having openings to admit heat, a cover to the drawing pot having a central opening and a removable closure, and masonry surrounding said pots and inclosing the dome.

3. A glass heating and drawing furnace, comprising a melting furnace having side openings, a heating pot and a drawing pot near the furnace, a trough in the furnace, a spout communicating with the trough and heating pot, a dome on the heating pot having openings above the level of glass in said pot, a cover to the drawing pot having a central opening, masonry surrounding the pots and spaced apart therefrom and also inclosing the dome, and a partition wall between the pots and having top and bottom openings.

4. A glass heating and drawing furnace, comprising a heating pot, a dome to said pot having openings therein, a drawing pot communicating with the heating pot at the top and bottom and having an opening at the top and an opening at the side opposite the heating pot, masonry surrounding said pots and spaced apart therefrom and also inclosing the dome, means for supplying glass to the heating pot, and means for applying heat to said parts.

5. A glass heating and drawing furnace, comprising a heating pot having a dome, a drawing pot having a removable flat top provided with a central opening and a removable closure, masonry surrounding the pots and having an arch inclosing the dome, said masonry having a removable wall at the front of the drawing pot and at the front of the dome, whereby the said walls may be removed without disturbing the remainder of the masonry.

6. A glass heating and drawing furnace, comprising a melting furnace having side openings, a heating pot spaced apart from the end of the furnace, a trough in the end of the furnace next the pot, a spout communicating with the trough and pot, a cover for the trough, a dome on the pot having side openings and a top opening, a chimney above the top opening, a drawing pot communicating with the heating pot at both top and bottom, a flat cover to the drawing pot and having an opening and a removable closure, masonry surrounding the pots and inclosing the dome, and means for supplying heat between the masonry and pots.

In testimony whereof I affix my signature in presence of two witnesses.

ULGISSE HOUZE.

Witnesses:
NOEL J. HOUZE,
PALMER A. JONES.